US009122734B2

(12) United States Patent
Castro et al.

(10) Patent No.: US 9,122,734 B2
(45) Date of Patent: *Sep. 1, 2015

(54) TRANSPARENT DATA SERVICE SUITABLE FOR MODIFYING DATA STORAGE CAPABILITIES IN APPLICATIONS

(71) Applicant: International Business Machines Corporation, Armonk, NY (US)

(72) Inventors: Paul C. Castro, Sharon, MA (US); Marco Pistoia, Amawalk, NY (US); John Ponzo, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,301

(22) Filed: Sep. 16, 2013

(65) Prior Publication Data
US 2014/0181025 A1 Jun. 26, 2014

Related U.S. Application Data

(63) Continuation of application No. 13/723,934, filed on Dec. 21, 2012.

(51) Int. Cl.
*G06F 17/30* (2006.01)
(52) U.S. Cl.
CPC .... *G06F 17/30575* (2013.01); *G06F 17/30212* (2013.01); *G06F 17/30215* (2013.01)
(58) Field of Classification Search
CPC .................... G06F 17/30575; G06F 17/30215; G06F 17/30212

USPC ......... 707/600, 602, 634, 610–614, 617–618, 707/620
See application file for complete search history.

(56) References Cited

U.S. PATENT DOCUMENTS

| 6,622,263 | B1 * | 9/2003 | Stiffler et al. | 714/13 |
|---|---|---|---|---|
| 7,206,827 | B2 | 4/2007 | Viswanath et al. | |
| 7,350,210 | B2 | 3/2008 | Mueller et al. | |
| 7,366,460 | B2 | 4/2008 | O'Farrell et al. | |
| 7,840,615 | B2 * | 11/2010 | Jose et al. | 707/822 |
| 7,853,961 | B2 | 12/2010 | Nori et al. | |
| 8,495,577 | B2 * | 7/2013 | Crosby | 717/125 |
| 2003/0009530 | A1 * | 1/2003 | Philonenko et al. | 709/206 |
| 2003/0229686 | A1 * | 12/2003 | Kortright | 709/220 |
| 2006/0021185 | A1 * | 2/2006 | Lee | 15/387 |
| 2007/0198602 | A1 | 8/2007 | Ngo et al. | |
| 2007/0214461 | A1 | 9/2007 | Glatron et al. | |

(Continued)

OTHER PUBLICATIONS

International Search Report issued in a counterpart foreign application PCT/US2013/076800 dated May 21, 2014.

*Primary Examiner* — Frantz Coby
(74) *Attorney, Agent, or Firm* — Harrington & Smith

(57) ABSTRACT

A method includes monitoring, on a computing device, data events corresponding to manipulation of data by an application. The monitoring is performed by a data library service that is embedded in the application. The method includes, in response to the monitoring indicating first data on the computing device is modified by the application, synchronizing, by the computing device under control at least in part of the data library service, second data stored on one or more storage providers in a network with the first data modified by the application and stored on the computing device. Apparatus and computer program products are also disclosed.

15 Claims, 7 Drawing Sheets

(56) References Cited

U.S. PATENT DOCUMENTS

| | | |
|---|---|---|
| 2008/0189340 A1* | 8/2008 | Blea et al. ............... 707/204 |
| 2009/0055802 A1* | 2/2009 | Crosby ............... 717/125 |
| 2009/0271412 A1 | 10/2009 | Lacapra et al. |
| 2009/0300656 A1 | 12/2009 | Bosworth et al. |
| 2010/0023533 A1 | 1/2010 | Celi, Jr. et al. |
| 2010/0191783 A1 | 7/2010 | Mason et al. |
| 2011/0126168 A1 | 5/2011 | Ilyayev |
| 2012/0017213 A1* | 1/2012 | Hunt et al. ............... 718/100 |
| 2012/0072581 A1 | 3/2012 | Tung et al. |
| 2012/0089572 A1 | 4/2012 | Raichstein et al. |
| 2012/0166576 A1 | 6/2012 | Orsini et al. |
| 2012/0239704 A1 | 9/2012 | O'Farrell et al. |
| 2013/0304697 A1* | 11/2013 | Movida ............... 707/610 |
| 2014/0013310 A1* | 1/2014 | Crosby ............... 717/125 |

\* cited by examiner

TRANSPARENT DATA SERVICE SUITABLE FOR MODIFYING DATA STORAGE CAPABILITIES IN APPLICATIONS

CROSS-REFERENCE TO RELATED APPLICATIONS

This patent application is a continuation of U.S. patent application Ser. No. 13/723,934, filed on Dec. 21, 2012, which is incorporated herein by reference in its entirety to provide continuity of disclosure.

BACKGROUND

This invention relates generally to data storage by applications executing on electronic computing systems and, more specifically, relates to remote data storage by applications.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms that appear in the text or drawings are defined below, prior to the claims.

Many applications rely on data that is stored remotely, that is, stored off the computing device on which the application resides. In fact, dozens of network-based storage service providers have appeared that can offer large amounts of network-based storage fairly inexpensively. They offer high availability and have had little or no downtime in their service thus far. Examples include Apple's iCloud, Amazon S3, Google Drive, Microsoft Skydrive, Dropbox.com, Box.net, and a raft of other providers that have transformed network storage into a commodity. These storage services are attractive for an application developer primarily because of cost. The developer does not need to manage a private storage infrastructure and can pay only for storage consumed rather than peak provisioning. These benefits are not just recognized by developers, as enterprises are now outsourcing many traditional IT services to cloud-based providers as well. This trend is likely to continue, but enterprises will have more thoughtful policies as to what and how certain enterprise data can be stored on an external storage provider.

While there are many benefits to using cloud storage services, there are many complexities.

BRIEF SUMMARY

The following summary is merely intended to be exemplary. The summary is not intended to limit the scope of the claims.

In an example, a method is disclosed that includes monitoring, on a computing device, data events corresponding to manipulation of data by an application. The monitoring is performed by a data library service that is embedded in the application. The method includes, in response to the monitoring indicating first data on the computing device is modified by the application, synchronizing, by the computing device under control at least in part of the data library service, second data stored on one or more storage providers in a network with the first data modified by the application and stored on the computing device.

In another example, an apparatus is disclosed that includes one or more memories comprising computer-readable code and one or more processors. The one or more processors are configured in response to executing the computer-readable code to cause the computing device to perform: monitoring, on a computing device, data events corresponding to manipulation of data by an application, the monitoring performed by a data library service that is embedded in the application; and in response to the monitoring indicating first data on the computing device is modified by the application, synchronizing, by the computing device under control at least in part of the data library service, second data stored on one or more storage providers in a network with the first data modified by the application and stored on the computing device.

In another example, an apparatus comprises: means for monitoring, on a computing device, data events corresponding to manipulation of data by an application, the monitoring performed by a data library service that is embedded in the application; and means, responsive to the monitoring indicating first data on the computing device is modified by the application, for synchronizing, by the computing device under control at least in part of the data library service, second data stored on one or more storage providers in a network with the first data modified by the application and stored on the computing device.

An additional example is a program product that includes a computer readable storage medium comprising computer-readable code to cause a computer to perform the following: code for monitoring, on a computing device, data events corresponding to manipulation of data by an application, the monitoring performed by a data library service that is embedded in the application; and code, in response to the monitoring indicating first data on the computing device is modified by the application, for synchronizing, by the computing device under control at least in part of the data library service, second data stored on one or more storage providers in a network with the first data modified by the application and stored on the computing device.

DETAILED DESCRIPTION

As stated above, while there are many benefits to using cloud storage services, there are many complexities. For instance, developers have to evaluate cost and feature sets of various storage providers, and once the developer chooses one provider, changing storage providers can be costly. Code will have to be rewritten as no two storage providers share the same interface, and the developer will have to compensate for differences in the feature sets between two providers. Enterprise developers also must ensure that their application follows storage policies. For example, all data may have to be encrypted before the data is stored in the cloud. The term "cloud" has many connotations, but in this case refers generally to a network providing on-demand data storage. There are also optimizations to consider; most devices run on metered networks and data transfers may incur significant costs.

Figure 1:
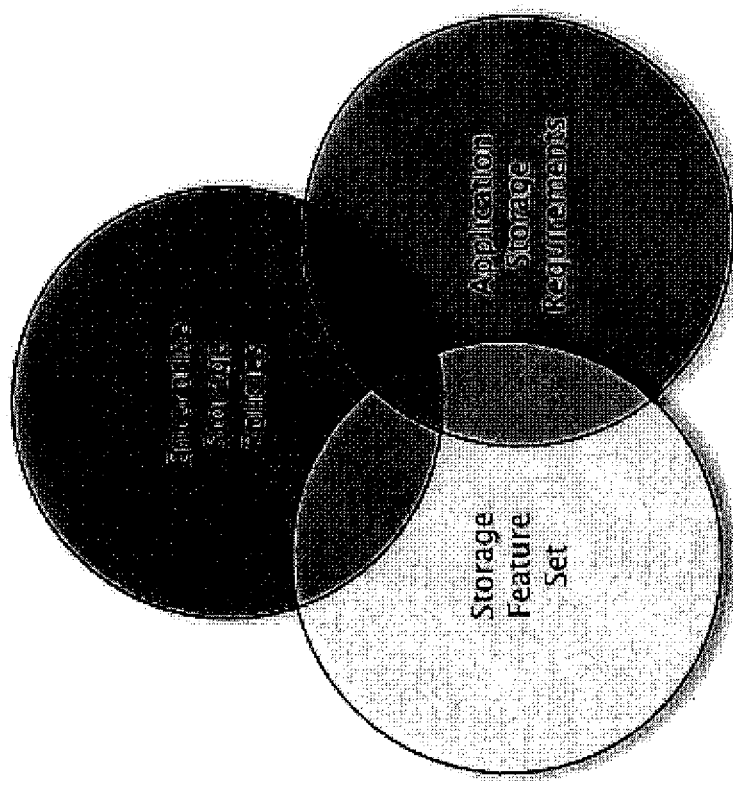
FIG. 1 is an illustration of the intersection of requirements, policies, and feature sets of storage providers interact.

FIG. 1 shows how the requirements of the application, enterprise storage policies, and the feature set of the storage provider interact. The instant description is most concerned with how the requirements and policies intersect with the storage feature set. In some cases, the storage feature set may satisfy the needs of the application but cannot natively enforce the enterprise policies. In other cases, the storage feature set can natively support enterprise policies but does not meet the requirements of the application. This is likely a dynamic situation. For example, the developer may wish to switch to a different (e.g., lower cost) storage provider that may provide a different feature set than the one currently being used.

This potentially means that every time a new storage provider is used, the enterprise has to reevaluate whether the storage feature set can natively support enterprise policies. Furthermore, enterprise developers may have to rewrite applications to interface correctly with the new storage provider, especially if the storage feature set does not natively support enterprise policies or supports different enterprise policies as compared to the previous storage provider.

By contrast, exemplary embodiments herein introduce the concept of a data library service, which, through an instrumentation process in an exemplary embodiment, is embedded into application code and then deployed with the application to a client. The data library service activates when the application launches and runs in the background.

Figure 2:
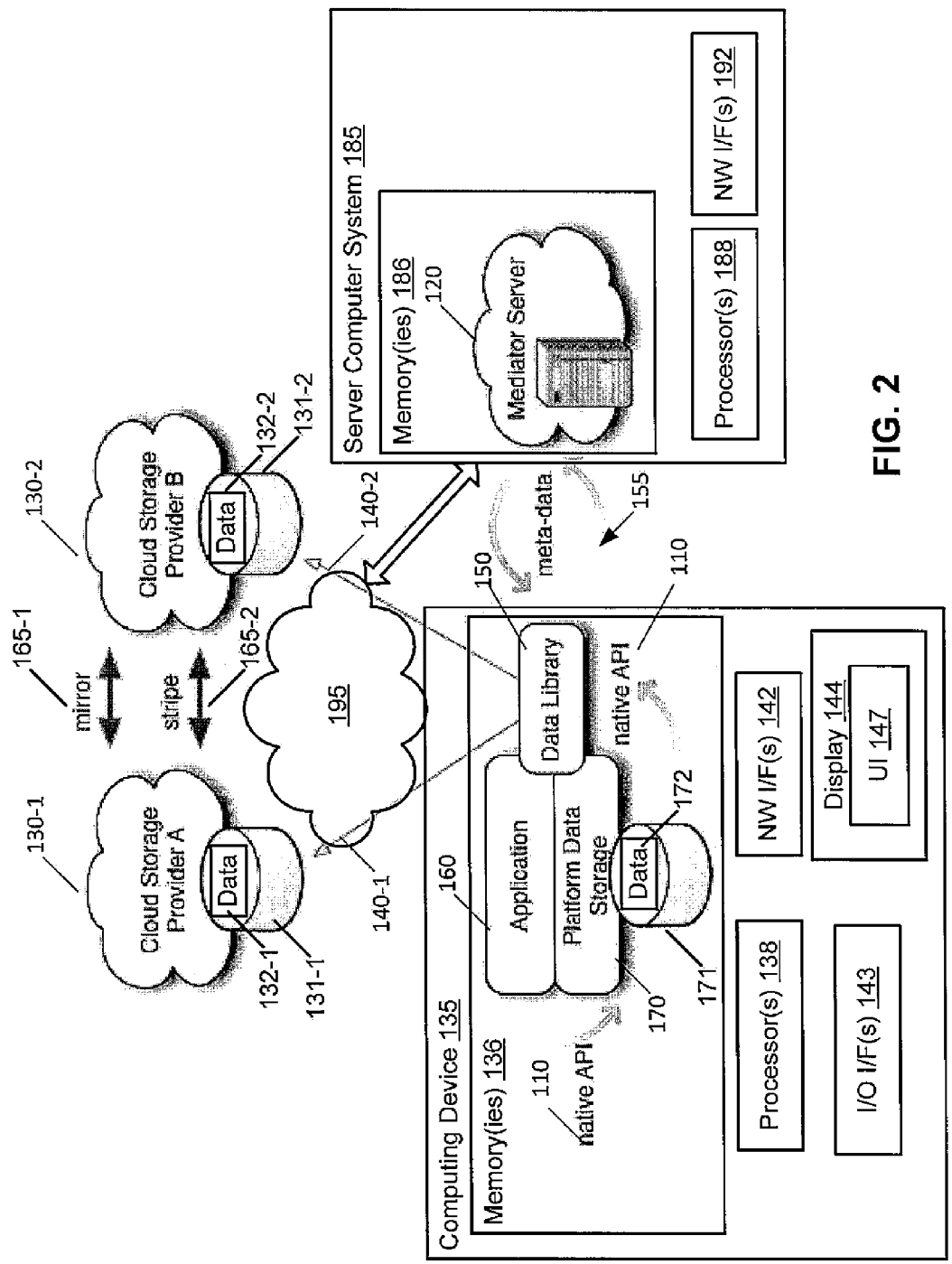
FIG. 2 is an overview of a transparent data service, which includes a client-side component (labeled "Data Library"), and an optional server-side component (labeled "Mediator Server")

Referring to FIG. 2, this figure is an overview of a transparent service, which includes a client-side component (labeled "Data Library" for a data library service 150), and an optional server-side component (labeled "Mediator Server" 120). The data library service 150 is implemented on a computing device 135. The computing device 135 also comprises one or more memories 136, one or more processors 138, one or more I/O interfaces 143, and one or more wired or wireless network interfaces 142, and in this example a display 144. This example provides an application 160, a platform data storage 170, and the data library service 150 as computer-readable program code that is executable by the one or more processors 138 to cause the computing device 135 to perform one or more of the operations described herein. In another example, the operations may also be performed, in part or completely, by circuitry that implements logic to carry out the operations. The circuitry may be implemented as part of the one or more processor(s) 138. The processors 138 may be any electronic circuit, such as a digital signal processor, application specific integrated circuit, programmable logic, and/or single-core or multi-core general purpose processors. The memories 136 may comprise non-volatile and/or volatile RAM, cache memory, NAND-based flash memory, and/or read only memory. This example further comprises a storage system 171 in memories 136, which uses a non-volatile, typically large-size (relative to other memories 136) memory. Depending on implementation, memory 136 may include removable or non-removable non-volatile memory. The display 144 may be a touchscreen, flatscreen, monitor, television, projector, as examples. The one or more I/O interfaces 143 may include interfaces through which a user may interact with the computing device 135. The network interfaces 142 may be wired or wireless and may implement a number of protocols, such as cellular or local area network protocols. The elements in computing device 135 may be interconnected through any technology, such as buses, traces on a board, interconnects on semiconductors, and the like.

The server computer system 185 comprises one or more memories 186, one or more processors 188, and one more network interfaces 192. These elements are similar to their corresponding elements in computing device 135. The one or more memories 186 in this example include the media server 120, which comprises computer-readable code that is executable by the one or more processors 188 to cause the server computer system 185 to perform one or more of the operations described herein. In another example, the operations may also be performed, in part or completely, by circuitry that implements logic to carry out the operations. The circuitry may be implemented as part of the one or more processor(s) 188.

The computing device 135 communicates through a network 195 (e.g., the Internet, a local area network) with the cloud storage providers A 130-1 and B 130-2, each of which has a corresponding storage system 131-1 and 131-2, respectively.

The client-side component, the data library service 150, uses the native API 110 of the platform data storage 170 to monitor data events caused by the host application. The host application 160 does not interact with the data library service 150, but rather uses the native platform API 110 to register for events. Most modern platforms include such an API 110 to monitor events related to creating, reading, updating, and deleting data 172. It is assumed herein that the data 172 is stored in the storage system 171, but the data 172 may be stored anywhere in the memories 136. The figure shows the data library service 150 interacting via two links 140-1, 140-2 with two different cloud storage providers 130-1, 130-2, respectively, as well as an optional mediator server 120. The "cloud" is a network of interconnected computers, and cloud storage is a model of networked online storage where data is stored on one or more virtual servers (in this case, cloud storage providers 130).

In an exemplary embodiment, the data library service 150 treats local platform storage (e.g., storage system 171) as a large cache, and performs incremental backups and restores of data 172 to one or more cloud storage providers 130. A strategy the data library service 150 employs to perform this duty is dictated by how the data library service 150 is configured. For example, the data library service 150 may interact with only one storage provider 130 to perform all operations in one configuration, but can be re-configured to interact with two storage providers 130 in another configuration. As just one example of why multiple storage providers might be advantageous, the data library service can be configured to mirror data (as indicated by mirror 165-1) between storage provider A and storage provider B so the data 172 is stored redundantly (that is, a copy of data 172 is stored on each of the providers 130 as data 132, where data 132-1 is the same as data 132-2), or the data library service 150 can be configured to split the data 172 into mutually exclusive sets of data 132-1, 132-2 stored and then partitioned on both providers (as indicated by stripe 165-2).

Also in FIG. 2 is an optional mediator server 120. If configured so, the data library service 150 can communicate with the mediator server 120 to send metadata 155 about the operations of the media server and receive new configurations and commands. In an exemplary embodiment, the mediator server 120 provides more ample storage and computation (relative to the storage in storage system 171 and the computing power in the processor(s) 138) for performing data related analytics and can act as an aggregator for many clients with instantiations of the data library service 150. From analytics, the mediator server 120 can keep track of where data is located and maintain a version history of different replicas of the same data. The mediator can be an important part of an exemplary system, but the mediator server 120 is optional. The exemplary library service can run completely on the client-side. The purposes of the mediator server 120 include but are not limited to one or more of the following:

1. The mediator server 120 may include an administrative component for configuring data library service 150 instances and setting up communication channels (e.g. an implementation might require the use of an MQTT broker that needs to be started somehow).

2. The mediator server 120 may be a location for collecting and storing information, i.e., provenance, about data events occurring across instances of the data library.

3. The mediator server 120 may include a platform for running analytics on the information collected for item 2 above to help optimize the overall operation of data libraries services 150.

Specifically, the data library service 150 may be responsible for one or more of the following exemplary and non-limiting functions:

1. Authenticating the application 160 with the cloud storage provider 130;

2. Implementing a data interaction protocol for a given storage provider 130;

3. Comparing the data 172 in the local storage (e.g., the storage system 171) with that stored in the cloud on one of the storage systems 131;

4. Applying any needed features to the local data 171 to conform to enterprise (or other) policies;

5. Synchronizing the data 171 between the local storage and the data 132 stored in the cloud;

6. Performing full backups and restores of data 172 between the client (i.e., computing device 135) and data 132 the cloud;

7. Keeping a log of all interactions between itself and the cloud storage providers 130;

8. Optionally, the data library service 150 interacts with a mediator server 120 to upload an interaction log, receive new configuration data, and receive commands to perform certain data-related actions. The mediator server 120 acts as an aggregator for metadata from many clients and can be used for analytics.

Concerning backups and restores, backups and restores are something a user typically initiates through the application 160. These differ from the more generic "data synchronization" performed in exemplary embodiments which happens automatically in that backup and restore have a notion of versions not present in normal synchronization. In other words, a user should be able to restore data from a specific version number. The instant monitoring of data events is more for the synchronization case, where it is ensured that all replicas of the data are the same across devices. In exemplary embodiments, there is no notion of version number other than the most recent version. Version numbers and versions of data are not excluded, and could be added if desired, although adding versions will increase complexity of the system.

Figure 3:
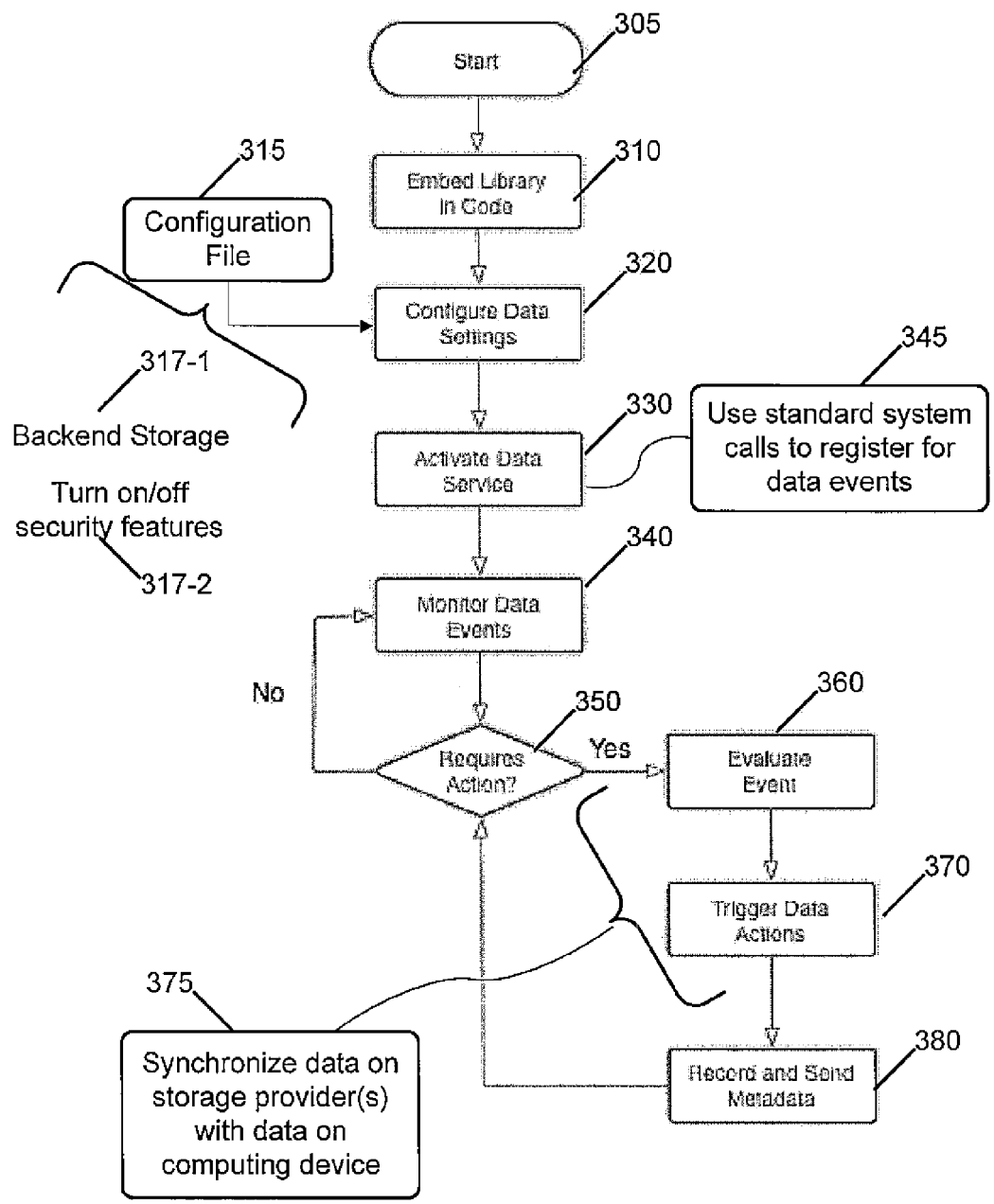
FIG. 3 is a logic flow diagram illustrating operations performed by a data library service and illustrating the operation of an exemplary method, a result of execution of computer program instructions embodied on a computer readable memory, and/or functions performed by logic implemented in hardware, in accordance with an exemplary embodiment of this invention.

FIG. 3 illustrates exemplary operations used to implement the functions of the data library service 150. FIG. 3 also illustrates the operation of an exemplary method, a result of execution of computer program instructions embodied on a computer readable memory, and/or functions performed by logic implemented in hardware, in accordance with an exemplary embodiment of this invention. It is noted this process is performed for a single application. In other words, the data library service 150 is embedded in a single application and only monitors data events and responds to data events for the single application. The flow starts in block 305. In block 310, it is assumed there is access either to the source code of the application 160 or to the binary code of application 160. The data library service 150 is embedded (block 310) into the code using an instrumentation process, where "instrumentation" refers at least to an ability to monitor data operations performed by the application 160. This process could involve changing the source code, or existing techniques could be applied that work with application binaries that require no access to the original source code. That is, both manual and automated options are possible for instrumentation. In the first case (manual option), the developer could link his or her application to the data library service 150, for instance, by causing an instantiation of a data library service 150 to occur. Since an exemplary implementation of the data library service 150 does not introduce APIs, the developer is done after linking. More specifically, there is no interaction (other than the linking) between the application 160 and the data library service 150, such that the data library service is instantiated in response to instantiation of the application, but no interaction between the data library service and the application occurs other than the instantiation of the data library service. In the second case (automated option), an infrastructure has been built to automate this linking even if there is only access to the binary code of the application 160. In particular, it is possible to analyze the binary code of an application written for, e.g., the Android OS (an operating system for mobile devices from Google), and perform byte injection to append code to the application 160 to provide the application 160 with the data library service 150. This requires no access to the original source code, nor does the application have to be aware that the data library service 150 has been added. Again, the data library service is instantiated in response to instantiation of the application, but no interaction between the data library service and the application occurs other than the instantiation of the data library service.

Once the data library service 150 is embedded into the program code for the application 160, the data library service 150 may be configured (block 320) for operation. In an example, the configuration is performed through the creation, e.g., by an administrator of an enterprise, of a configuration file 315. This configuration file 315 is read by the data library service 150 when the data library service 150 launches to set operation parameters, e.g. details about what backend storage the service should use (see indication 317-1 of the backend storage to be used), whether or not security features should be turned on (see indication 317-2, "turn on/off security features"), and the like. The configuration comprises in an example two main settings: storage provider settings, and replication settings. Storage provider settings include authentication information for different storage providers 130, as well as any specific settings required by the storage provider protocol. Replication settings are agnostic to specific storage settings, and determine the replication behavior of the data library service 150. That is, all storage providers are just viewed as "big dumb disks" and at a high level are viewed as interchangeable, in an exemplary embodiment, by the data library service 150. However, at a lower level the data library service 150 should, in an example, also know the details about the storage providers to normalize feature sets, e.g., add encryption if the provider does not natively support encryption. Examples of replication behavior include using a single storage provider for backup and restore, mirroring data across multiple storage providers, or partitioning data across multiple storage providers. It is noted that, in one example, a user using the computing device 135 does not perform the configuration in block 320. Instead, this configuration is performed by an enterprise, e.g., via an administrator configuring the data library service 150 via the configuration file 315. In another example, some or the entire configuration is performed by a user using the UI 147, e.g., by using the UI 147 to select for instance one or more storage providers.

When the data library service 150 is fully configured, the data library service 150 can be activated in block 330. Activation occurs in response, e.g., to a first launch of the application into which the data library service 150 is embedded. The data library service 150 does not have to be loaded prior to loading the application 160. In fact, the data library service 150 may be a child process of the main application, such that, in response to launching the main application, the data library automatically gets instantiated. Depending on the platform, the data library service 150 can run as a background process even if the application 160 is not in the foreground or suspended (as can occur on a mobile device as computing device 135), or the data library service 150 can run only when the application 160 is running. The data library service 150 registers itself (block 345) with the platform data storage 170 on the platform as a listener for data events for the application 160. For example, Windows, Mac OSX, iOS and Android OS all have facilities (such as system calls) for applications 160 to listen to (i.e., monitor) data events.

After the data library service 150 activates, the data library service 150 spends the majority of its time waiting for data events by monitoring (block 340) these events. Data events include notifications that data is created, read, updated, and/or deleted by the application 160. The data library service 150 evaluates each data event as the event occurs, and determines whether or not to take any actions (block 350). The events that require actions are the events that modify data. For example, in response to the data library service 150 receiving a data creation event, the data library service 150 will determine that action is necessary (block 350=Yes), since this event modifies data. If the data library service 150 receives a data read event, the data library service 150 may determine that no action is necessary (block 350=No), since this event should not modify data.

If action is necessary (block 350=Yes), the data library service 150 evaluates (block 360) the event to determine the appropriate course of action and then triggers the action (block 370). For example, if data 172 is modified locally, the data library service 150 may determine that synchronization of the data 172 is necessary. Modification of data could include deletion of portions or all of a file, additions to portions of a file, addition of files, replacement of one file with another file, and the like. At that point, an action is triggered to synchronize data 132 on the storage provider(s) 130 with the local data 172. At least block 370 can be considered, therefore, to synchronize (block 375) data 132 on the storage provider(s) 130 with local data 172, although block 360 also may be considered to synchronize the data 132 on the storage provider(s) 130 with local data 172, since data events should both be evaluated and triggered to maintain synchronization. The triggering of data actions in block 370 in an example includes issuing one or more data storage commands, described below in reference to block 510.

For all actions, the data library service 150 typically records (block 380) metadata regarding the event that caused the action and the action taken. This metadata can be stored locally, or uploaded (block 380) to the optional mediator server 120 for analysis. The mediator server 120 can extract important information regarding how data 172 is replicated and maintained and then use that information to optimize the overall performance of the data library service 150. As one example of an optimization, the mediator server 120 can determine from the metadata log how often data needs to be replicated with the backend storage provider. The mediator server 120 can generate a new configuration for the data library service 150 that minimizes the cost of the replication by commanding the data library service 150 to replicate only when WiFi is available, as an example.

Figure 4:
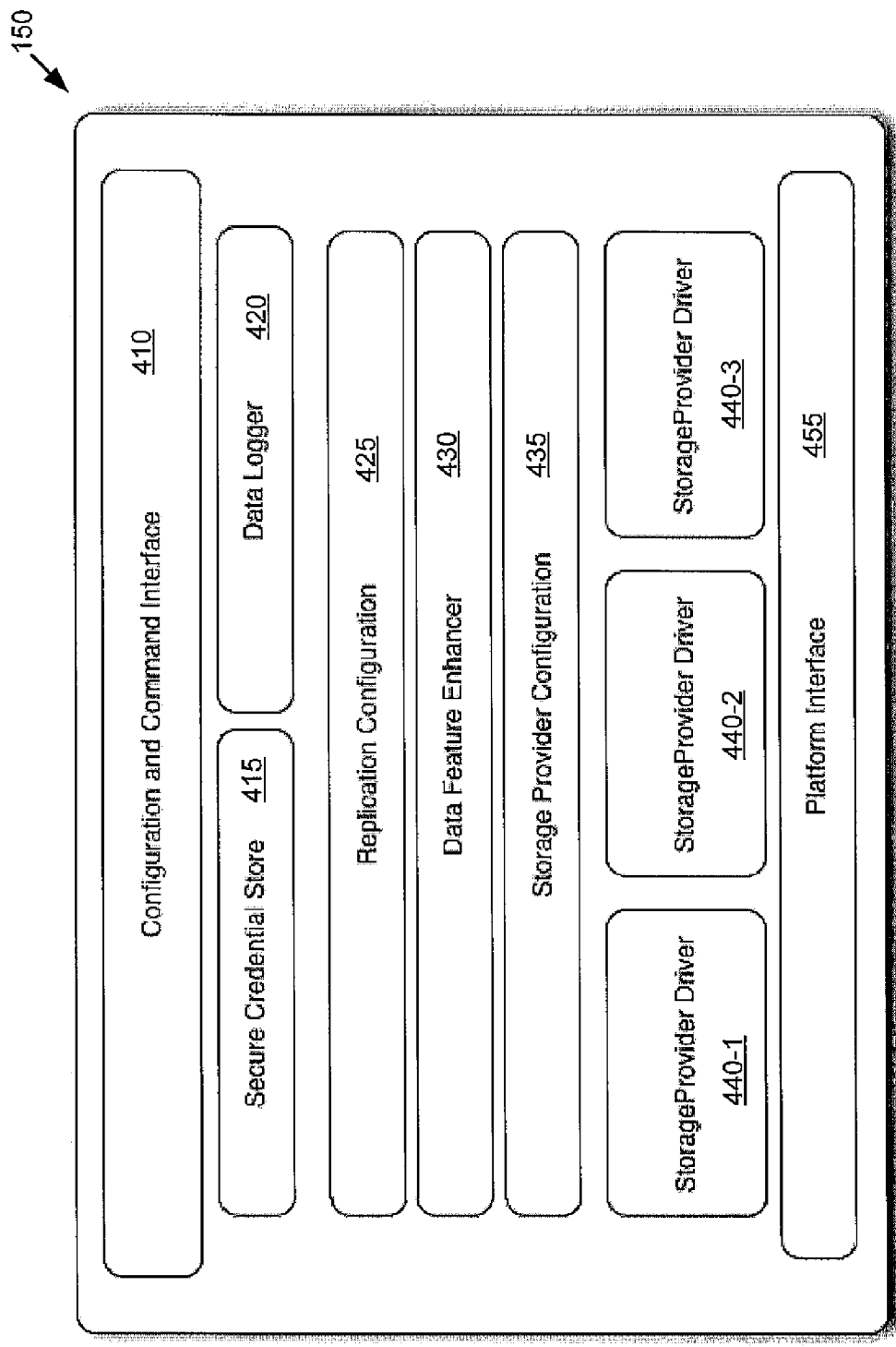
FIG. 4 is a block diagram illustrating an overview of components forming the data library service.

An overview of an exemplary embodiment of the data library service 150 is shown in FIG. 4. This example follows a typical implementation pattern where lower-level entities (at the bottom of the figure) interface with a platform (e.g., an OS of the platform) and an administrator or the mediator server 120 interfaces with the higher-level entities (at the top of the figure). There are many examples of this implementation pattern, including the Open Systems Interconnection (OSI) model for communication systems. Starting at the bottom, the data library service 150 includes a platform interface 455, which integrates the functions of the data library service 150 with the native platform services (e.g., via the native API 110 and the platform data storage 170) for registering itself to monitor data events. The platform interface also contains the necessary functions which allow the data library service 150 to perform basic data operations such as copy and move data within the local storage system.

Above the platform interface 455 are StorageProvider drivers 440 (of which three are shown), which implement the authentication and data interface protocols with the backend storage providers 130. Note that part of the configuration of the data library service 150 may include specifying which StorageProvider drivers 440 are necessary. The data library service 150 can be kept relatively small by minimizing the number of included StorageProvider drivers 440, as well as features included in the data feature enhancer (described below).

Above the drivers 440 is the storage provider configuration 435. This component is responsible for selecting one or more storage providers 130 to perform an operation such as replication. This component can be configured using, e.g., a configuration policy file or programmatically by accessing a configuration interface (e.g., via UI 147) in the data library service 150.

The data feature enhancer 430 contains implementations of features that are not natively part of the storage provider 130 but necessary to conform to enterprise policy data requirements. For example, many enterprises may require that data be encrypted before storing outside the company IT infrastructure. If the storage provider 130 does not natively encrypt the data, the data library service 150 can include a data feature enhancer 430 that encrypts the data 172 before allowing the data 172 to be replicated. This process is described in more detail below, in reference to FIG. 5.

[0051] The replication configuration 425 acts closely with the lower-level components to perform the necessary replication tasks. In some sense, the replication configuration 425 orchestrates when and how data should be replicated, but does not have detailed information on the mechanisms to make replication happen (this is left to the lower-level components to implement). The replication configuration 425 can be configured using a policy file or programmatically by accessing a (e.g., via UI 147) in the data library service 150.

The data logger 420 records metadata regarding the event that caused the action and the action taken. The secure credential store 415 may store and provide access to security credentials, e.g., so that the data library service 150 can access securely a storage provider 130. The configuration and command interface 410 provides an interface to enable a user and/or administrator (e.g., or configuration utility) to configure the data library service 150. The interface 410 also provides an interface for commands (such as "replace storage provider A with storage provider B" or "perform striping using both storage provider A and storage provider B"). It is noted that the data monitoring (e.g., block 340 of FIG. 3) and metadata recording/sending (e.g., block 380 of FIG. 3) are part of data logger 420. The triggering (e.g., block 370 of FIG. 3) is accomplished through replication configuration 435, in an exemplary embodiment.

Figure 5:
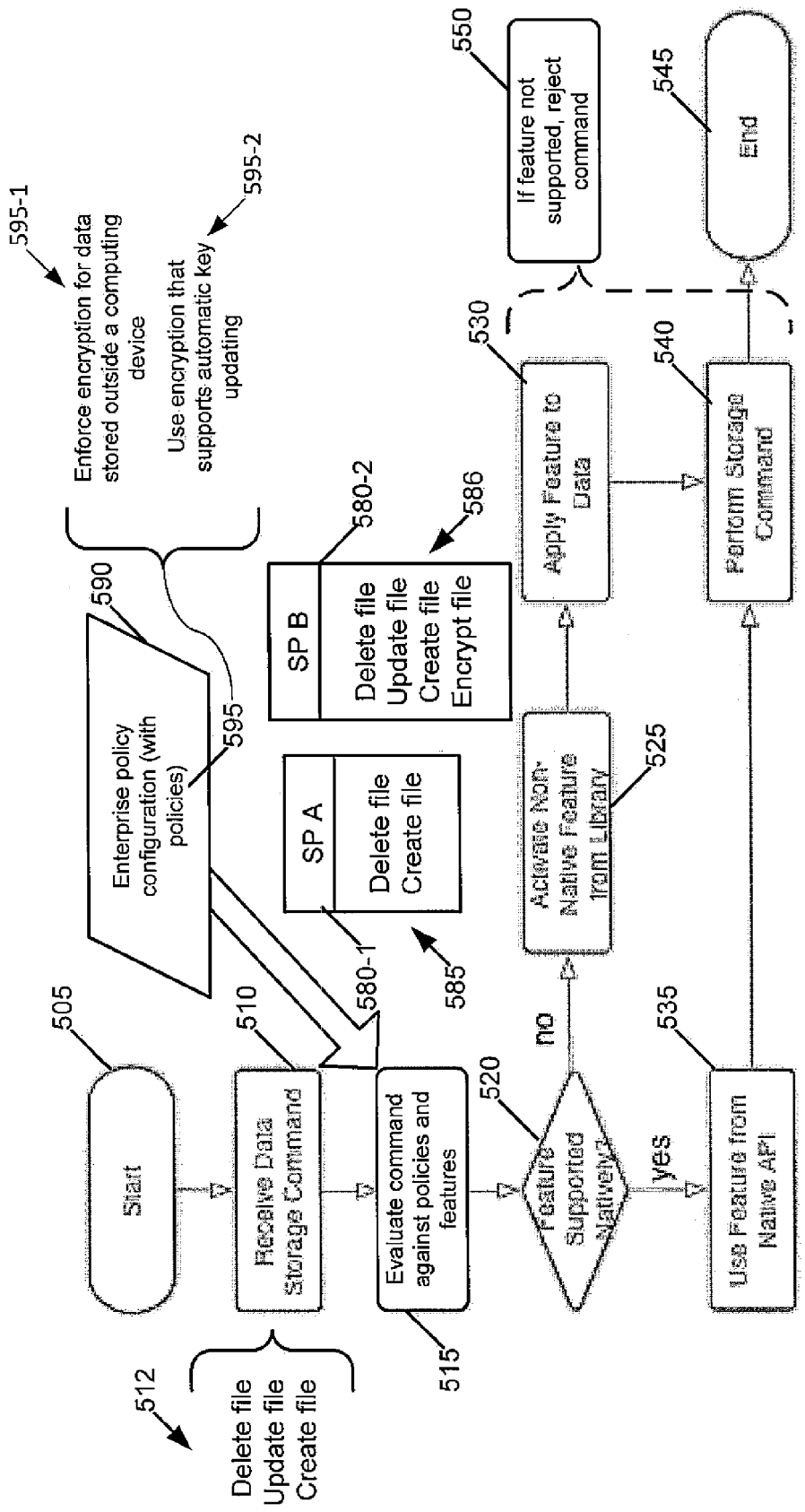
FIG. 5 is a logic flow diagram illustrating operations performed to extend features of a service provider and illustrating the operation of an exemplary method, a result of execution of computer program instructions embodied on a computer readable memory, and/or functions performed by logic implemented in hardware, in accordance with an exemplary embodiment of this invention.

Turning to FIG. 5, a logic flow diagram is shown that illustrates operations performed to extend features of a service provider 130. This figure also illustrates the operation of an exemplary method, a result of execution of computer program instructions embodied on a computer readable memory, and/or functions performed by logic implemented in hardware, in accordance with an exemplary embodiment of this invention. The flow starts in block 505. In the figure, the data feature enhancer 430 will receive data storage commands 512 (corresponding, in an exemplary embodiment, to the triggered data actions in block 370 of FIG. 3) from the replication configuration 425 in block 510. The data storage commands 512 are commands that are meant to be implemented by the cloud storage provider(s) 130. In the example of FIG. 5, the data storage commands include the commands of "delete file" (e.g., delete a file stored as data 132 at a storage provider 130 that corresponds to a local file previously stored as data 172 in the computing device 135 but recently deleted), "update file" (e.g., replace file stored as data 132 at a storage provider 130 with a local file stored as data 172 in the computing device 135), and "create file" (e.g., create a new file stored as data 132 at a storage provider 130 and populate with a recently created local file stored as data 172 in the computing device 135).

The data feature enhancer 430 will evaluate (block 515) the commands 512 against the enterprise policy configuration 590 (and the policies 595 therein) and the feature set 585 of the storage provider(s) 130 currently being used. Exemplary policies 595, are shown as the policy 595-1 ("Enforce encryption for data stored outside a computing device") and the policy 595-2 ("Use encryption that supports automatic key updating"). Policy 595-1 requires that any data stored outside a computing device 135 to be encrypted. Policy 595-2 requires that an encryption scheme that is used support automatic key updating (e.g., a process where keys are automatically updated to new keys). In this example, the set 580-1 of features 585 corresponds to the cloud storage provider 130-1 and the set 580-1 of features 586 corresponds to cloud storage provider 130-2. The feature set 580-1 includes features 585 of "delete file" and "create file", while the feature set 580-2 includes features 586 of "delete file", "update file", "create file", and "encrypt file". In this example the features 585 do not have the feature of "encrypt file", so encryption is not natively supported by the cloud storage provider 130-1. The features 586 do have the feature of "encrypt file", so encryption is natively supported by the cloud storage provider 130-2. However, neither of the features 585 or 586 has a feature corresponding to automatic key updating. It should be noted that the features 512, 585, and 586 use the same terminology to refer to the same features, however this is merely for ease of exposition and not a requirement. For instance, the feature 512 of "create file" may correspond to a feature of "replicate file" supported by a cloud storage provider 130. Also, although the feature set 580-1 does not include a feature of "update file", a file may be updated by deleting the current filed stored as data 132 in the cloud storage provider 130-1 and creating a new file in data 132 with the data 172 in the modified local file.

Figure 6:
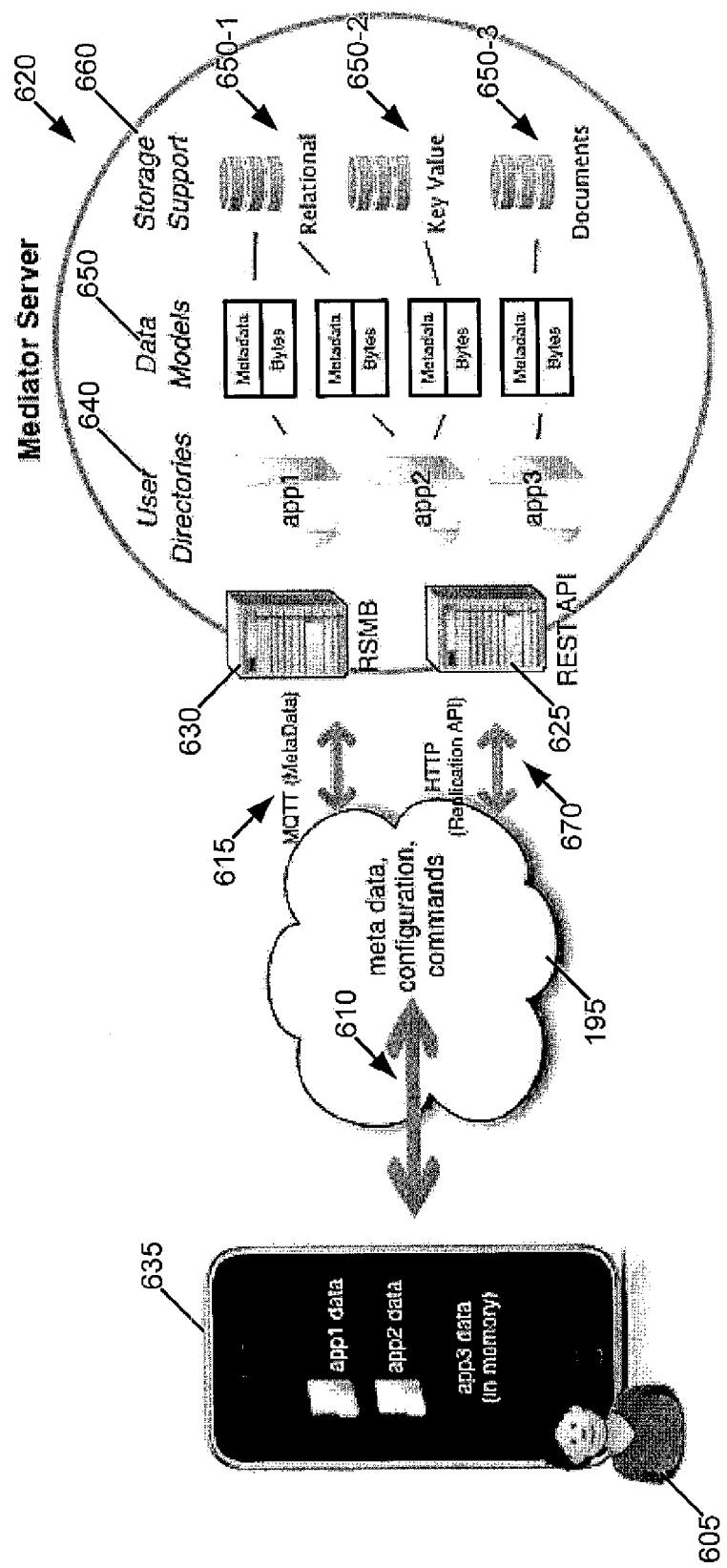
FIG. 6 is an example of a mediator server implementation.

In block 520, it is determined whether a feature 512 is natively supported by the storage provider and if so (block 520=Yes), then the data feature enhancer 430 will ensure that the data storage command 512 is configured to use that feature during the execution of the command (block 535). For instance, an "update file" command 512 would also include encryption of the file. By "natively supported", this means, e.g., the cloud storage provider 130 provides the feature (e.g., and the data library service 150 can access and use the feature). If a needed feature is not natively supported (block 520=No), then the data feature enhancer 430 will activate (block 525) an implementation of the feature (if available) from the data library service 150. This feature can be executed locally, or the data library service 150 can forward data 172 and an indication of the computation (e.g., encryption using a certain encryption scheme) to be performed to the mediator server 120, which then performs the computation and returns the result (e.g., an encrypted file). After execution of block 530 or 535, the original storage command is performed in block 540. The flow ends in block 545. Note that, in an exemplary embodiment, only features with implementations included in the data library service 150 can be executed in this manner. If the policy 595 specifies a feature that is not implemented, then the data library service 150 cannot use the storage provider 130 and the data command will be rejected in block 550 (which is performed in place of blocks 530 and 540). In the example of FIG. 6, neither cloud storage provider 130 supports a feature of automatic key updating, and assuming the data library service 150 also does not support this feature, then block 550 is performed, where the command is rejected (that is, the underlying data action is not performed). Block 550 may also include alerting the mediator server 120 that the feature of automatic key updating is not supported by current storage providers 130, sending an email to an IT administrator that the automatic key updating is not supported by current storage providers 130, or any other action suitable for the rejection of this type of command.

FIG. 6 provides more details on an exemplary mediator server 620. The mediator server 620 can be used to receive, store, and analyze metadata from the data library service 150. The figure shows an example where the mediator server 620 is also used as a storage provider 130 for backup and restore. The computing device 135 in this example is a smartphone 635, operated by a user 605, who uses three applications 160 (shown as app1, app2, and app3), each of which has corresponding data 172.

In this example, all metadata, configuration, and commands are sent (via link 610 through the network 195) to the mediator server 120 to keep a complete record of all actions that have occurred in the data library service 150. The mediator server has two communication channels 615 and 670. The first channel 615 is for metadata, and utilizes a lightweight messaging MQTT (Message Queue Telemetry Transport) messaging server 630 shown as RSMB (Really Small Message Broker). This allows for inexpensive, near real-time communication between the data library service 150 and the mediator server 620. The second channel 670 is used to replicate higher volume data and is implemented using a REST (REpresentational State Transfer) API 625 using HTTP and a replication API. That is, the server 625 uses a REST API, which is a generic API type, and on top of that, the server 625 can implement a higher-level API specifically for replication (shown as "Replication API"). For example, a version of a server has been implemented that uses WebDAV, which is a REST API with some specialization for handling file operations. The data 172 from the mobile device 635 is placed into three directories 640 corresponding to the three applications 160 (app1, app2, and app3). To store data, the mediator server 620 has built-in support for three data models 650: relational 650-1, key value pairs 650-2, and documents 650-3 (byte arrays). Data stored in the mediator server 620 is organized by application type, and metadata is stored along with the actual data items (where the actual data items are shown as "Bytes"). In this example, app1 has data fitting the relational model 650-1 and therefore is stored in corresponding storage support 660 for this model; app2 has data fitting both the relational model 650-1 and key value model 650-2 and therefore is stored in corresponding storage support 660 for each of these models; and app3 has data fitting the documents model 650-3 and therefore is stored in corresponding storage support 660 for this model. It is noted that the data models 650 are exemplary different types of data models that application developers might want to use, e.g., some developers may prefer using relational databases so organize everything by tables, while others just need key value stores. Other data models may be used.

The mediator server 620 has a global view of operations of the data library service 150, e.g., spread over many computing devices 135/mobile devices 635. As such, metadata stored in the mediator server 620 can be used to perform analytics for optimizations that are not possible with only a local view of data (as seen by a single instance of the data library service 150). Such optimization include, but are not limited to, determination of data redundancy for improved availability, migration of data across data providers to reduce cost and/or data read performance, and strategies to implement sideload strategies given known locations of replicas.

Figure 7:
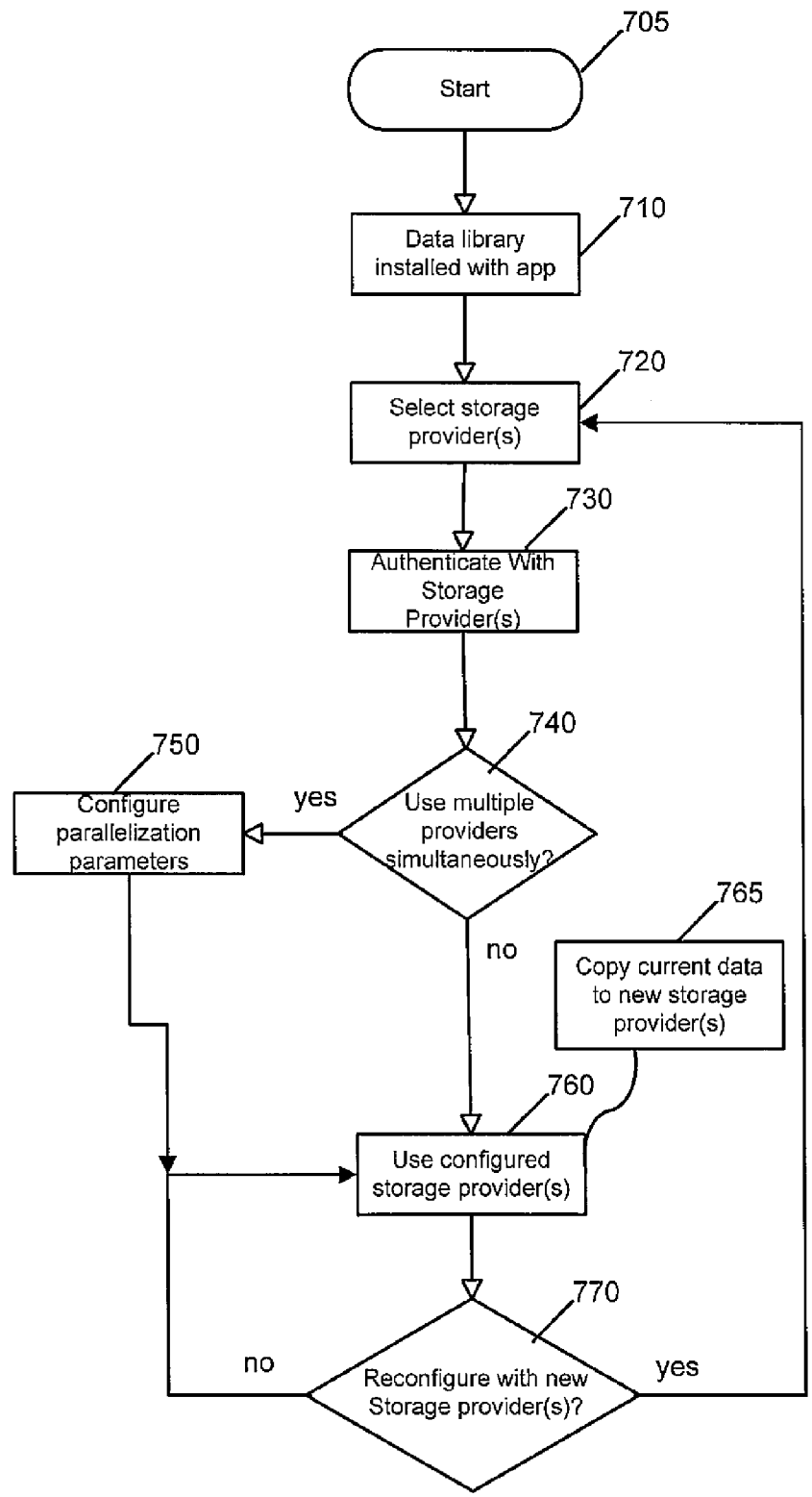
FIG. 7 is a logic flow diagram illustrating operations performed to provide selection of storage providers and illustrating the operation of an exemplary method, a result of execution of computer program instructions embodied on a computer readable memory, and/or functions performed by logic implemented in hardware, in accordance with an exemplary embodiment of this invention.

FIG. 7 is a logic flow diagram illustrating operations performed to provide selection of storage providers. The selection of storage providers may be made, e.g., via a configuration file 315 or user configuration. FIG. 7 also illustrates the operation of an exemplary method, a result of execution of computer program instructions embodied on a computer readable memory, and/or functions performed by logic implemented in hardware, in accordance with an exemplary embodiment of this invention.

As an overview and an example, there is some administrative authority that is allowed to configure the data library service 150. This can be some separate IT person who is not the user, but this could also be the user if desired. If it is the former, then data services for storage providers are transparent to the user.

In one example, a developer creates a photo sharing application ("app") 160 for a smartphone (as computing device 135), and the photo sharing app is later linked, e.g., by an IT administrator, to the data library service 150 through the instrumentation process described above. The app 160 writes image files (as data 172) to the file system of the smartphone and nothing more. The data library service 150 detects that the data is written, and uploads the image files to a particular cloud storage provider 130—this is because during instrumentation the IT administrator configured the data library to write to the particular cloud storage provider 130. In practice, configuration is usually performed by creating a configuration file 315 which contains the settings that the data library service 150 should use that include the selected storage provider(s). When the app launches, the app 160 runs the data library service 150 automatically, which reads the configuration file 315 for the settings. The user does not need to do anything (except perhaps enter a username and a password for the particular cloud storage provider 130 when the photo sharing app first launches).

In another example, the user of the photo sharing app 160 has the ability to select which storage providers to use because the developer adds this to their application. This differs from the previous example where the developer need not have any knowledge of the data library service 150. In this case, the developer knows the data library service 150 will be used so writes code to manually configure the data library, which in an exemplary embodiment just writes the same configuration file 315 that the administrator creates in the previous example. When this version of the photo sharing app launches, the data library service 150 reads the configuration file 315 as before.

In yet another example, the data library service 150 may be provided with an interface for UI 147 on the display 144, which would allow the user of the computing device 135 to initially and/or intermittently select the cloud storage provider(s) 130 the data library service 150 should use. Once set up (either initially or intermittently), including entering username(s) and password(s) if required for the cloud storage provider(s), the data library service 150 should operate transparently.

The flow in FIG. 7 starts in block 705. In block 710, the data library service 150 is installed on the device with the application (app) 160. In block 720, in response to the application 160 running or being configured, the data library service 150 can select the storage providers to use by reading a configuration file 315 which tells the data library service 150 what to do. Alternatively, there could be a setting that users can change to select the storage provider manually (e.g., in a preferences setting for either the application 160 or the data library service 150, where the application 160 could write the configuration file 315 in an exemplary embodiment).

In block 730, the app 160 and/or the data library service 150 will, if necessary, authenticate with the storage provider (or providers) 130 selected in block 720 so the storage provider(s) can be used. If the app 160 (or the data library service 150) wants to use more than one storage provider 130 at once (block 740=Yes), then there are additional settings that should be set for parallel use (block 750). For example, the app 160 or data library service 150 may want to have complete replicas of data duplicated on all storage providers, or the app may want to evenly partition the data across storage providers randomly. There may be other app-specific preferences for how the storage providers should be used, such as "use storage provider A for storing images and storage provider B for video data". However, the app 160 or data library service 150 can also just use a single storage provider, which does not require the settings regarding how data is stored on multiple providers. The app 160 then operates normally and the data library service 150 monitors data events and uses the storage providers as configured (block 760) and as described above. It is noted that if new storage provider(s) have been configured, then data from the previous storage provider(s) 130 can be copied from the previous storage provider(s) to the new storage provider(s). That is, the data library service 150 operates to cause the data from the previous storage provider(s) 130 to the new storage provider(s). See block 765.

At some point, the app 160, user 605, or data library service 150, as the case may be, may want to reconfigure to use new storage provider(s) 130. The entity should be allowed to do so, and block 770 allows the entity to reconfigure the data library service 150 to use new storage providers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Acronyms that appear in the text or drawings are defined as follows.
API Application Programming Interface
HTTP HyperText Transmission Protocol
IT Information Technology
MQTT Message Queue Telemetry Transport
OS Operating System
RAM Random Access Memory
REST REpresentational State Transfer
RSMB Really Small Message Broker
UI User Interface
WebDAV Web Distributed Authoring and Versioning

What is claimed is:

1. A method, comprising:
monitoring, on a computing device, data events corresponding to manipulation of data by an application, the monitoring performed by a data library service that is embedded in the application; and
in response to the monitoring indicating first data on the computing device is modified by the application, synchronizing, by the computing device under control at least in part of the data library service, second data stored on one or more storage providers in a network with the first data modified by the application and stored on the computing device.

2. The method of claim 1, wherein the data library service is embedded in the application by an instrumentation process that provides a link to the data library service in source code of the application.

3. The method of claim 1, wherein the data library service is embedded in the application by an instrumentation process that provides byte injection to append code for the data library service to binary code of the application.

4. The method of claim 1, wherein the data on the computing device is modified by the application performing one or more of the following: changing a portion or all of the first data, deleting a portion or all of the first data, or creating a new portion or all of the first data.

5. The method of claim 4, wherein synchronizing further comprises causing the one or more storage providers to perform one or more actions on the second data so that the second data matches the first data after modification by the application.

6. The method of claim 1, wherein the data library service uses one or more system calls supported by an operating system of the computing device in order to register the data library service as a listener for data events corresponding to the application.

7. The method of claim 1, wherein the data library service is instantiated in response to instantiation of the application, but wherein no interaction between the data library service and the application occurs other than the instantiation of the data library service.

8. The method of claim 1, wherein synchronizing further comprises, in response to the one or more storage providers not supporting a feature required by a policy regarding data to be synchronized with storage providers, implementing the feature using a corresponding feature supported by the data library service, wherein the feature is implemented in order to synchronize the second data with the first data.

9. The method of claim 8, further comprising evaluating a data action, to be performed on the second data in response to the first data being modified, against the policy and one or more features supported by the one or more storage providers in order to determine the one or more storage providers do not support the feature required by the policy.

10. The method of claim 9, further comprising, in response to the feature not being supported by the one or more storage providers and not being supported by the data library service, not performing the synchronizing of the second data with the first data.

11. The method of claim 9, wherein synchronizing further comprises, in response to the one or more storage providers supporting a feature required by a policy regarding data to be synchronized with storage providers, implementing the feature using a corresponding feature supported by the one or more storage providers.

12. The method of claim 1, further comprising sending metadata regarding an event causing the monitoring to indicate the first data is modified by the application and regarding an action taken to perform the synchronizing the second data with the first data.

13. The method of claim 1, further comprising configuring the data library service to use the one or more storage providers for the synchronizing, wherein configuring the data library service further comprises one of reading a configuration file comprising one or more indications of the one or more storage providers or allowing a user to select the one or more storage providers.

14. The method of claim 1, further comprising causing a restore of second data stored on the one or more storage providers in the network in response to the synchronizing as the first data stored on the computing device, wherein the first data is synchronized with the second data.

15. The method of claim 1, wherein there are a plurality of storage providers used in the synchronizing and wherein the synchronizing further comprises one of striping the first data using the plurality of storage providers or replicating the first data using the plurality of storage providers in order to synchronize the second data with the first data.

* * * * *